(12) United States Patent
Demaree

(10) Patent No.: US 9,471,755 B2
(45) Date of Patent: Oct. 18, 2016

(54) FONT PROTECTION MANAGEMENT

(71) Applicant: Adobe Systems Incorporated, San Jose, CA (US)

(72) Inventor: David G. Demaree, Chicago, IL (US)

(73) Assignee: Adobe Systems Incorporated, San Jose, CA (US)

( * ) Notice: Subject to any disclaimer, the term of this patent is extended or adjusted under 35 U.S.C. 154(b) by 660 days.

(21) Appl. No.: 13/940,052

(22) Filed: Jul. 11, 2013

(65) Prior Publication Data

US 2015/0020212 A1 Jan. 15, 2015

(51) Int. Cl.
*G06F 21/00* (2013.01)
*G06F 21/10* (2013.01)

(52) U.S. Cl.
CPC ....... *G06F 21/10* (2013.01); *G06F 2221/0748* (2013.01)

(58) Field of Classification Search
USPC .......................................................... 726/17
See application file for complete search history.

(56) References Cited

U.S. PATENT DOCUMENTS

| | | | | | |
|---|---|---|---|---|---|
| 6,138,237 | A | * | 10/2000 | Ruben | G06F 21/10 713/162 |
| 6,233,340 | B1 | * | 5/2001 | Sandru | G06Q 20/04 283/17 |
| 9,195,808 | B1 | * | 11/2015 | Nestler | G06F 21/10 |
| 2003/0156719 | A1 | * | 8/2003 | Cronce | G06F 21/10 380/256 |
| 2004/0177056 | A1 | * | 9/2004 | Davis | G06F 17/214 707/999.001 |
| 2006/0253395 | A1 | * | 11/2006 | Corbell | G06F 17/214 705/50 |
| 2012/0001921 | A1 | * | 1/2012 | Escher | G06F 17/214 345/467 |
| 2012/0001922 | A1 | * | 1/2012 | Escher | G06F 17/214 345/467 |
| 2013/0254555 | A1 | * | 9/2013 | Greene | G06F 21/10 713/189 |

OTHER PUBLICATIONS

Zhu, Baoshi; Wu, Jiankang; Kankanhalli, Mohan S. Render Sequence Encoding for Document Protection. IEEE Transactions on Multimedia. vol. 9. Issue: 1. Pub. Date: 2007. http://ieeexplore.ieee.org/stamp/stamp.jsp?tp=&arnumber=4032625.*
Ransbug, Michael; Timmerer, Christian; Hellwagner, Hermann. Transport Mechanisms for Metadata-driven Distributed Multimedia Adaptation. 2005 1st International Conference on Multimedia Services Access Networks. MSAN '05. Pub. Date: 2005. http://ieeexplore.ieee.org/stamp/stamp.jsp?tp=&arnumber=1489936.*
Nguyen, Quyen L.; Lake, Alla. Content Server System Architecture for Providing Differentiated Levels of Service in a Digital Preservation Cloud. 2011 IEEE International Conference on Cloud Computing. Pub. Date: 2011. http://ieeexplore.ieee.org/stamp/stamp.jsp?tp=&arnumber=6008755.*

* cited by examiner

*Primary Examiner* — Jeremiah Avery
(74) *Attorney, Agent, or Firm* — Wolfe-SBMC

(57) ABSTRACT

Font protection management is described. In one or more implementations, a font package is obtained for an application and includes fonts that are protected by obfuscation. When the application is launched, a request to determine whether use of the protected fonts is authorized in connection with the application may be communicated to a font protection service. A response that is indicative of authorization to use the protected fonts in connection with the application may be received from the font protection service. When the response indicates that use of the protected fonts is authorized, the protected fonts may be de-obfuscated and subsequently used in connection with the application. When the response indicates that use of the protected fonts is not authorized in connection with the application, however, default fonts may be used with the application instead.

20 Claims, 8 Drawing Sheets

FONT PROTECTION MANAGEMENT

BACKGROUND

Font providers are often unwilling to license their content for use in applications due to concerns about piracy. Traditional techniques for including fonts in an application involve embedding unprotected files for the fonts within the application. However, such techniques expose the fonts for access in a usable form with minimal effort. In some conventional approaches, individual application developers negotiate arrangements with font providers whereby a provider will license its font for application embedding, but only if the developer agrees to encrypt the font data in the application package, and then decrypt it for use. Although transmission of fonts "in the clear" may be avoided using this approach, it provides no way of tracking usage or preventing improper use of decrypted fonts. In addition, the lack of standard font encryption processes places a burden on developers to comply with particular font providers' licenses and terms for use.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Font protection management techniques are described. In one or more implementations, a font package is obtained for an application and includes fonts that are protected by obfuscation. When the application is launched, a client may communicate a request to a font protection service to determine whether use of the protected fonts is authorized in connection with the application. A response may be received from the font protection service that is indicative of authorization to use the protected fonts in connection with the application. When the response indicates that use of the protected fonts is authorized, the protected fonts may be de-obfuscated and subsequently used in connection with the application. When the response indicates that use of the protected fonts is not authorized in connection with the application, however, default fonts may be used with the application instead.

Additionally, a service may receive and process a request to authorize use of the protected fonts. Based on processing of the request, a determination is made regarding whether use of the protected fonts is authorized in connection with an application. A response that is indicative of authorization to use the protected fonts may then be communicated to a client device that sent the request. If use of the protected fonts is authorized, the response is configured to contain information sufficient to enable the protected fonts to be de-obfuscated and subsequently used in connection with the application. On the other hand, if use of the protected fonts is not authorized, the response is configured to indicate that use of the protected fonts is not authorized and default fonts may be used in connection with the application rather than the protected fonts.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Traditionally, there has been no digital rights management (DRM) for fonts that is interoperable across a variety of platforms. Consequently, font providers may generally be unwilling to license their content for use in applications, in part, because available techniques for including fonts in an application lack sufficient protection.

Font protection management techniques are described. In one or more embodiments, a font package is obtained for an application and includes fonts that are protected by obfuscation. When the application is launched, a client may communicate a request to a font protection service to determine whether use of the protected fonts is authorized in connection with the application. A response may be received from the font protection service that is indicative of authorization to use the protected fonts in connection with the application. When the response indicates that use of the protected fonts is authorized, the protected fonts may be de-obfuscated and subsequently used in connection with the application. When the response indicates that use of the protected fonts is not authorized in connection with the application, however, default fonts may be used with the application instead.

Additionally, a service may receive and process a request to authorize use of the protected fonts. Based on processing of the request, a determination is made regarding whether use of the protected fonts is authorized in connection with an application. A response that is indicative of authorization to use the protected fonts may then be communicated to a client device that sent the request. If use of the protected fonts is authorized, the response is configured to contain information sufficient to enable the protected fonts to be de-obfuscated and subsequently used in connection with the application. On the other hand, if use of the protected fonts is not authorized, the response is configured to indicate that use of the protected fonts is not authorized and default fonts may be used in connection with the application rather than the protected fonts.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
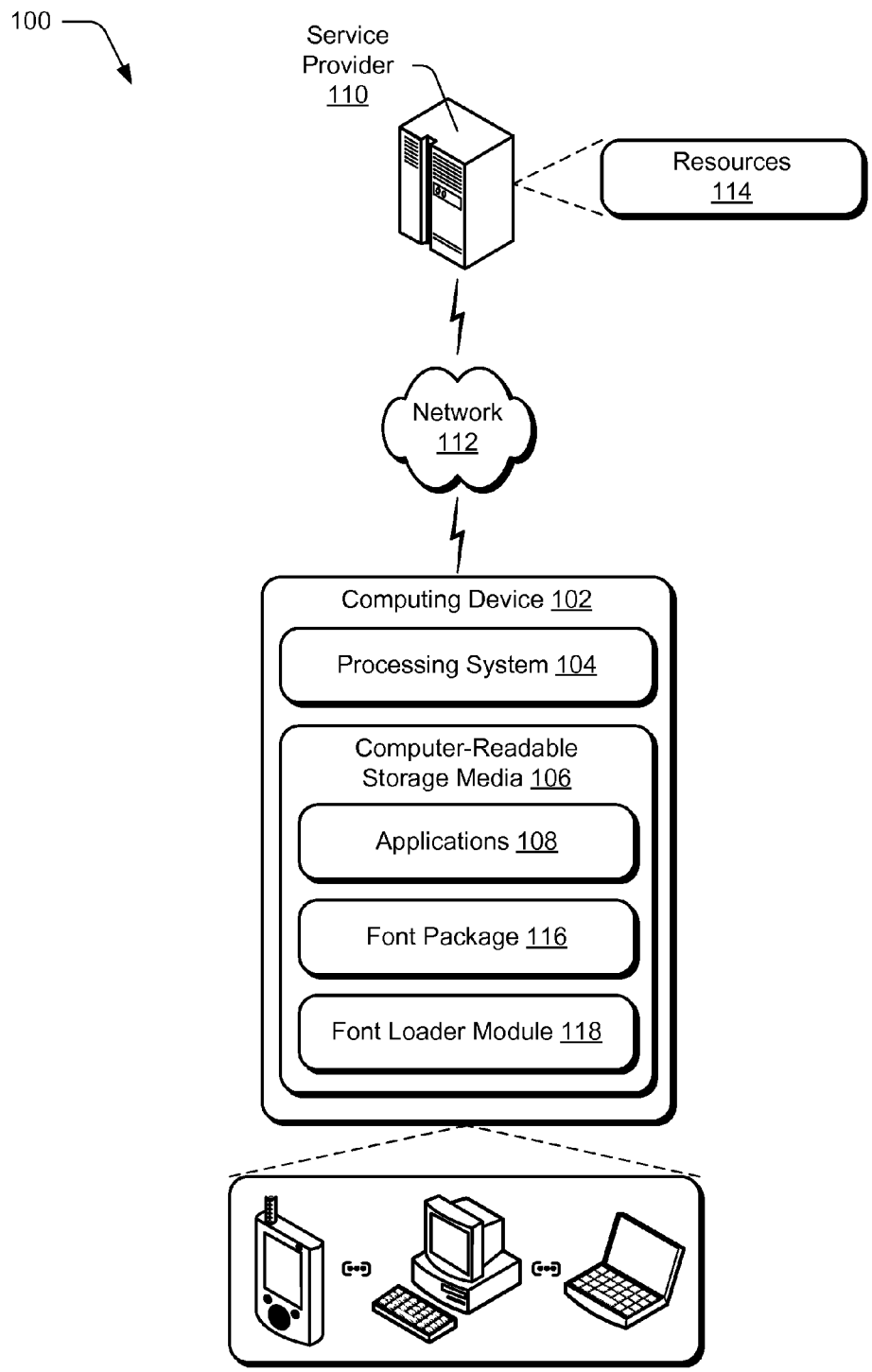
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 having a processing system 104 that may include one or more processing devices, one or more computer-readable storage media 106, and applications 108 embodied on the computer-readable storage media 106 and operable via the processing system 104 to implement corresponding functionality described herein. In at least some implementations, the applications 108 may include a mobile application (e.g., to provide content and services tailored specifically for a mobile device). Further, the applications 108 may include a browser of the computing device 102 operable to access various kinds of web-based resources (e.g., content and services). The applications 108 may also represent a client-side component having integrated functionality operable to access web-based resources (e.g., a network-enabled application), browse the Internet, interact with online providers, and so forth. In any case, at least some of the applications 108 provide interfaces for display on the computing device 102 that include text. The text included in such interfaces may be displayed using a variety of different fonts.

The computing device 102 may be configured as any suitable type of computing device. For example, the computing device 102 may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The environment 100 further depicts one or more service providers 110, configured to communicate with computing device 102 over a network 112, such as the Internet, to provide a "cloud-based" computing environment. Generally speaking, a service provider 110 is configured to make various resources 114 available over the network 112 to clients. In some scenarios, users may sign up for accounts that are employed to access corresponding resources from a provider. The provider may authenticate credentials of a user (e.g., username and password) before granting access to an account and corresponding resources 114. Other resources 114 may be made freely available, (e.g., without authentication or account-based access). The resources 114 can include any suitable combination of services and/or content typically made available over a network by one or more providers. Some examples of services include, but are not limited to, a news or periodical service, a photo editing service, a web development and management service, a collaboration service, a social networking service, a messaging service, an advertisement service, and so forth. Content may include various combinations of text (displayed using a variety of fonts), video, ads, audio, multimedia streams, animations, images, web documents, web pages, applications, device applications, and the like.

The computing device 102 may also include or make use of a font package 116 and a font loader module 118 that represent functionality operable to implement font protection management as described herein. For example, the font package 116 and the font loader module 118 may be configured in various ways to facilitate using protected fonts in connection with authorized applications. To do so, the font loader module 118 may be configured to unpack protected fonts from the font package 116. As part of unpacking the protected fonts, the font loader module 118 may obtain authorization from a font protection service to use the protected fonts in connection with an application. For authorized applications, the font loader module 118 loads the protected fronts so that they may be used in connection with those applications. In this way, text may be displayed for an authorized application using the protected fonts included in the font package 116. Additionally, the font loader module 118 may be configured to load default or system fonts in connection with an application, such as when an application is not authorized to use the protected fonts of the font package 116.

The font loader module 118 may be implemented as a software module, a hardware device, or using a combination of software, hardware, firmware, fixed logic circuitry, etc. Further, the font loader module 118 may be implemented as a standalone component of the computing device 102 as illustrated. In addition or alternatively, the font loader module 118 may be configured as a component of an application 108, an operating system, or other device application.

In at least some implementations, the font package 116 and the font loader module 118 are configured to operate in connection with applications that are available to end users from an application "store". Using an application store, the service provider 110 may be configured to make applications from various developers available for download to individual client devices. Some of the applications available from the store may be made freely available while others are available only if purchased. The application store may facilitate the purchase and download of applications by an end user. By way of example and not limitation, an application store may be accessible through a user's mobile device such that the mobile device can be used to purchase applications from the store that are configured for the mobile device. At least one of the applications 108 may be configured as an application that receives software updates from an application store. Other applications are also contemplated. For example, an application authorized to make use of the protected fonts included in the font package 116 may be a browser or network-enabled application used to represent webpages, documents, and other web-based content.

Having considered an example environment, consider now a discussion of some example details of the techniques for font protection management in accordance with one or more implementations.

Font Protection Management Details

Figure 2:
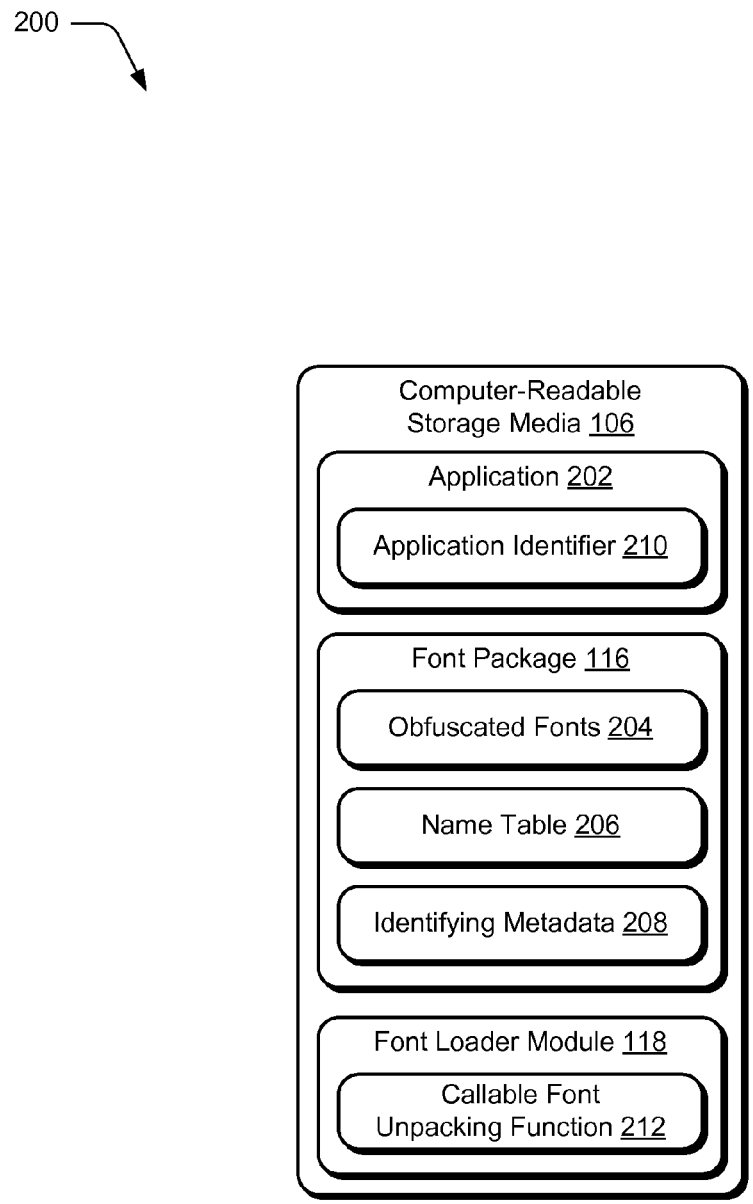
FIG. 2 illustrates portions of the environment from FIG. 1 in greater detail.

This section describes some example details of font protection management in accordance with one or more implementations. FIG. 2 depicts generally at 200 some portions of the environment 100 of FIG. 1, but in greater detail. In particular, the computer-readable storage media 106 and the components included therein are depicted in greater detail. The computer-readable storage media 106 includes the font package 116 and the font loader module 118 as well as an application 202, which may correspond to one of the applications 108 depicted in FIG. 1.

Generally, fonts distributed for use with applications are distributed without protection, in part, because there is no uniform digital rights management (DRM) interoperable across different platforms for fonts. In the absence of a uniform approach to protect font data, many such platforms simply have not been configured to employ techniques for using protected fonts. As a result, fonts used with these various platforms, which have no way of decoding protected fonts, must be unprotected. Consequently, in many conventional approaches fonts are simply distributed "in the clear". Font providers, however, oftentimes do not want their fonts to be freely distributed. Instead, font providers would like to protect their fonts so that the fonts cannot be trivially moved from one computer to another, or used with applications not licensed to use the fonts. Font protection management provides a consistent way to protect fonts across various platforms using font packages and a distributed font loader module.

In general, the font package 116 is obtained for use with a particular application, such as application 202. In at least some implementations, the font package 116 may be included as part of the application 202. Naturally, the font package 116 may be obtained with the application 202 when part of the application. In other implementations, the font package 116 may be separate from the application 202. When separate from the application 202, the font package 116 may be obtained along with (but not included as part of) the application or may be obtained separately from the application.

The font package 116 includes obfuscated fonts 204, a package-specific name table 206, and identifying metadata 208. The obfuscated fonts 204 may comprise binary fonts themselves (e.g., OpenType or TrueType fonts) that are protected by obfuscation. The binary fonts may be obfuscated using any of a variety of techniques. For example, obfuscating transforms may be applied to the binary fonts. Alternately or additionally, the binary fonts may be scrambled, hashed, encrypted, or the like. Other obfuscation techniques may be applied to obfuscate font data without departing from the spirit and the scope of the techniques described herein. In any case, the obfuscation of binary font data is effective to inhibit fonts from being trivially moved from one computer to another, or used with applications not licensed to use the fonts.

The obfuscated fonts 204 may be de-obfuscated and then used in connection with a particular application with which the font package 116 is associated. The obfuscated fonts 204 may be obfuscated in such a way that they are not only particular to an application, but are also particular to the font package 116. Although the obfuscated fonts 204 correspond to a particular application, the way in which the fonts are called for use by an application may not be application-specific. The name table 206 included in the font package 116 may map the way in which a font is called to the obfuscated font's application and package-specific identity. For example, the font package 116 may include a font generally identified as "sanseriflite". However, in the font package 116, the font may be uniquely identified using the font's identifier in combination with an identifier of the font package. The font package 116 may be associated with an identifier such as "PACKAGEID". Accordingly, the name table 206 for font package 116 can include an entry that maps "sanseriflite" to "PACKAGEID-sanseriflite". To access the obfuscated font identified as "PACKAGEID-sanseriflite" from the font package 116, an authorized application may simply refer to the font as "sanseriflite". In this way, the name table 206 may facilitate a uniform approach to employ font protection management techniques.

The identifier of the font package 116 (e.g., "PACKAGEID") and identifiers of the obfuscated fonts 204 (e.g., "PACKAGEID-sanseriflite") may be included in the font package as part of the identifying metadata 208. In general, the identifying metadata 208 may be configured as a watermark or other metadata that identifies users and applications that are permitted to open the obfuscated fonts 204 included in the font package 116. In various implementations, the identifier of the font package 116 is unique to the font package. Additionally, the identifying metadata 208 may include tokens or keys that identify each of the obfuscated fonts 204 in the font package 116. In at least some implementations, information in the identifying metadata 208 may be sufficient to generate tokens or keys to identify the obfuscated fonts 204 of the font package 116. Further, the identifying metadata 208 may be configured as Java Script Object Notation (JSON) metadata that identifies the font package 116 and the obfuscated fonts 204 included therein. In addition or alternately, the identifying metadata 208 may be configured as other types of serialized data, such as Property List (plist), extensible markup language (XML), and the like.

As noted above, the obfuscated fonts 204 of the font package 116 may be used in connection with a particular application, such as the application 202. The application 202 is depicted with an application identifier 210, which may be used to identify the application for use with the obfuscated fonts 204. The application identifier 210 may be embedded in source code of the application 202. From the source code of the application 202, the application identifier 210 may be accessible to facilitate associating the application 202 with the font package 116. As discussed in more detail below, the application identifier 210 may be generated in connection with the font package 116 and provided to a developer of the application 202. For instance, the application identifier 210 may be configured as a token that is displayed to a developer of the application 202 and may be copied into source code of the application.

To use the obfuscated fonts 204 in connection with the application 202, the font loader module 118 may be called. Font loader module 118 may be configured as a library available as part of the application 202, an application programming interface (API) available to the application and/or other applications, as a component of an operating system available to multiple applications running within the operating system, or otherwise. Other configurations of the font loader module 118 may also be employed without departing from the spirit and the scope of the techniques described herein.

In any case, the font loader module 118 may be configured to expose a callable font unpacking function 212. The callable font unpacking function 212 may be called when the application 202 is launched to initiate operation of the font loader module 118. Responsive to one such call, the font loader module 118 may be configured to unpack the obfuscated fonts 204 for use in connection with the application 202. However, the font loader module 118 will not unpack the obfuscated fonts 204 if their use is not authorized in connection with the application 202. When use of the obfuscated fonts 204 is not authorized in connection with the application 202, the font loader module 118 is configured to cause one or more default, fallback, or system fonts to be used instead.

As part of the unpacking, the font loader module 118 may form a request for communication to a font protection service to determine authorization to use the obfuscated fonts 204 in connection with the application 202. For example, the font loader module 118 may form the request a first time the application is launched. So long as a response is received from the font protection service the first time authorization is requested, the font loader module 118 need not form such requests when the application 202 is subsequently launched. If the font protection service is unavailable (e.g., a network connection cannot be established) the first time, however, the font loader module 118 may form another request to determine authorization to use the obfuscated fonts 204 the next time the application 202 is launched. The font loader module 118 may continue forming such requests each time the application 202 is launched until a response is received from the font protection service.

To form these requests, the font loader module 118 may use at least some of the identifying metadata 208 (e.g., an identifier of the font package 116 and identifiers of the obfuscated fonts 204) and the application identifier 210. In at least some implementations, this information may be provided to the font loader module 118, such as by specifying the information as parameters in a call to the callable font unpacking function 212. Additionally or alternately, the font loader module 118 may be configured to extract the identifying metadata 208 from the font package 116 and the application identifier 210 from the application 202. For example, the font loader module 118 may use a standard decryption library (e.g., OpenSSL) to read the font package 116 and parse its data using a JSON deserialization library.

In various implementations, the font loader module 118 may be configured to de-obfuscate the obfuscated fonts 204, such as when a response is received from the font protection service indicating that use of the obfuscated fonts is authorized in connection with the application 202. The font loader module 118 may de-obfuscate the obfuscated fonts using information contained in a response from the font protection service, such as a key, a shared secret, or other suitable information. In some implementations, the font loader module 118 may be unable to de-obfuscate the obfuscated fonts 204 without the information from the response. The font loader module 118 may also use the application identifier 210 in connection with de-obfuscating the fonts. As with the information provided in the response, the font loader module 118 may be unable in some implementations to de-obfuscate the obfuscated fonts 204 without the application identifier 210. The font loader module 118 may also use other information in connection with the de-obfuscation, including information provided by the font protection service, information included in the application 202, or information included in the font package 116.

Once the obfuscated fonts 204 have been de-obfuscated, the font loader module 118 may then load the de-obfuscated fonts for use in connection with the application 202. The font loader module 118 may also de-obfuscate the obfuscated fonts 204 when the font protection service is determined to be unavailable. In this scenario, the font loader may load the de-obfuscated fonts for temporary use with the application. If a response is subsequently received from the font protection service indicating that use of the obfuscated fonts 204 is not authorized in connection with the application 202, the font loader module 118 may subsequently load one or more default, fallback, or system fonts instead.

When a response is received from the font protection service, the font loader module 118 may be configured to have the response or information indicative of the response stored locally. Thus, when the application 202 is subsequently launched, the font loader module 118 may access the locally stored information to determine whether to load the obfuscated fonts 204 or the default fonts. By storing this information locally, the font loader module 118 may avoid having to request authorization from the font protection service each time the application 202 is launched.

Figure 3:
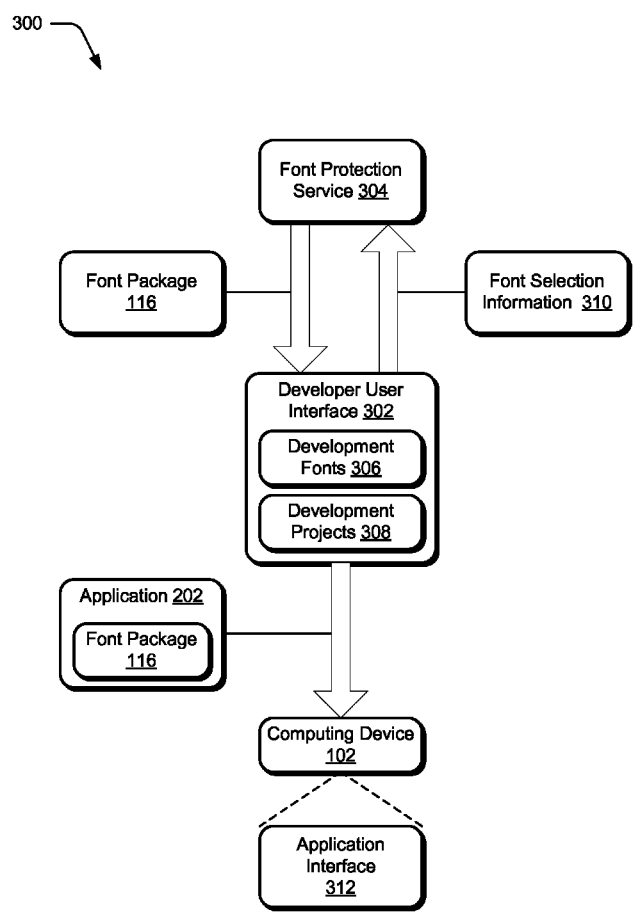
FIG. 3 is an example scenario in which a font package is generated for an application and distributed for use.

FIG. 3 depicts generally at 300 an example scenario in which a font package is generated for use in connection with an application and then distributed for use. For example, a developer may interact through a developer user interface 302 with a font protection service 304 to generate a font package, such as font package 116. The developer user interface 302 may be configured as a web page provided by the font protection service 304 and accessible via a web browser. The developer user interface 302 may provide access to a variety of fonts (e.g., OpenType and TrueType fonts) that are available for licensing. As noted above, font providers may be unwilling to make their fonts freely available. However, font providers may be willing to allow use of their fonts on a limited basis, such as in connection with applications for which use of the fonts is licensed (e.g., paid for). Developers may find that default or system fonts have an unsuitable appearance for a particular application. The default or system fonts may fail to make text displayed in association with an application "visually appealing". Instead, developers may find that custom-created fonts are more suitable for their needs, even though the fonts' providers are unwilling to make such fonts freely available. The developer user interface 302 and the font protection service 304 may facilitate the distribution of fonts to developers in exchange for compensation for the font providers.

The font protection service 304, for instance, may be configured to provide the developer user interface 302 to a developer based on a subscription with the font protection service. The developer user interface 302 may enable a developer to view and use any of the fonts available to the font protection service 304 on a limited development basis. The development fonts 306 depicted within the developer user interface 302 are illustrated to represent this functionality. The developer user interface 302 also includes development projects 308. The development projects 308 may include applications that are developed by the developer and for which the development fonts 306 are used. Development projects 308 may represent applications that a developer is developing, but not applications that are released (e.g., for beta testing or sold via an application store). For development projects 308, a developer may be free to use the development fonts 306 without having to pay a fee for them. In this way, a developer may be able to test a variety of different fonts in connection with a development project 308 and determine which fonts are suitable for a given project. In contrast, a developer may have to pay a fee to a font's provider each time an application is activated by an end user.

The font protection service 304 may enable a developer, through the developer user interface 302 or other means, to license or purchase fonts for use in connection with applications. For example, the font protection service 304 may enable a developer to purchase a number of licenses to use the fonts of the font protection service. The number of licenses purchased by the developer may correspond to a number of authorizations that the font protection service 304 is allowed to give to users of the application 202. In one or more implementations, a developer may pay a subscription fee, and while the subscription remains active, the font protection service 304 may authorize use of any of its fonts in connection with the developer's applications. The subscription model may entitle a developer to a certain number of authorizations over a particular time period. However, a developer may upgrade a subscription to a higher level thereby entitling the developer to a greater number of authorizations over the same time period. Approaches other than a subscription-based model and a pay-per-use model may also be employed for charging developers (or other parties) to have protected fonts authorized.

Regardless of how authorization to use the fonts of the font protection service 304 are paid for, the developer user interface 302 enables a developer to select which fonts are to be included with a project for distribution to end users. Based on a developer's font selection in the developer user interface 302, font selection information 310 may be communicated to the font protection service 304. The font selection information 310 indicates which fonts are to be included in in a development project 308. Using the font selection information 310, the font protection service 304 is configured to generate a font package. For example, the application 202 may correspond to one of the development projects 308 that a developer is ready to distribute. In this example, the font selection information 310 provided by the developer through the developer user interface 302 indicates which fonts are to be used in connection with the application 202 (e.g., "sanseriflite").

The font protection service 304 may then generate the font package 116 for the application 202. To generate the font package 116, the font protection service 304 obfuscates the unobfuscated/unencrypted font data of the selected fonts and generates the additional information for the font package 116, including the name table 206 and the identifying metadata 208. The font protection service 304 then packages the obfuscated fonts 204 and additional information into a serialized format, such as a JSON format or another suitable format. Through the developer user interface 302 the developer may select to download the font package 116 for use with the application 202. The font protection service 304 can communicate the generated font package 116 to the developer and may do so when the developer selects to download the font package.

In addition, the font protection service 304 is configured to generate a token (e.g., the application identifier 210) for inclusion in the source code of the application 202. In one or more implementations, the developer user interface 302 displays the token generated by the font protection service 304. The developer may thereby copy the token from the development user interface and embed it into the source code of the application 202. The token may be included in the software in other ways without departing from the spirit and the scope of the techniques described herein.

Once the developer has the font package 116 from the font protection service 304 and has embedded the application identifier 210 in the application 202, the developer may distribute the application 202 and the font package 116. Although the font package 116 is depicted as being distributed to the computing device 102 as part of the application 202, in at least some implementations the font package 116 may not be included as part of the application 202. When the font package 116 is not included as part of the application 202, it may be separate from but distributed with the application or it may be separate and distributed separately from the application. In addition, the application 202 and font package 116 may not be distributed directly to a computing device associated with an end user. Instead, the application 202 and font package 116 may first be distributed to one or more intermediaries (not shown) and then distributed to a computing device of the end user. Intermediaries may include mobile service providers, an application "store", a website that makes the application 202 available for download, and the like.

Regardless of the means by which the application 202 and the font package 116 are distributed, the application 202 and font package 116 are nevertheless distributed to a computing device, such as the computing device 102. At the computing device 102 text included in an application interface 312 of the application 202 may be displayed using the obfuscated fonts 204 of the font package 116 subject to authorization by the font protection service 304.

Figure 4:
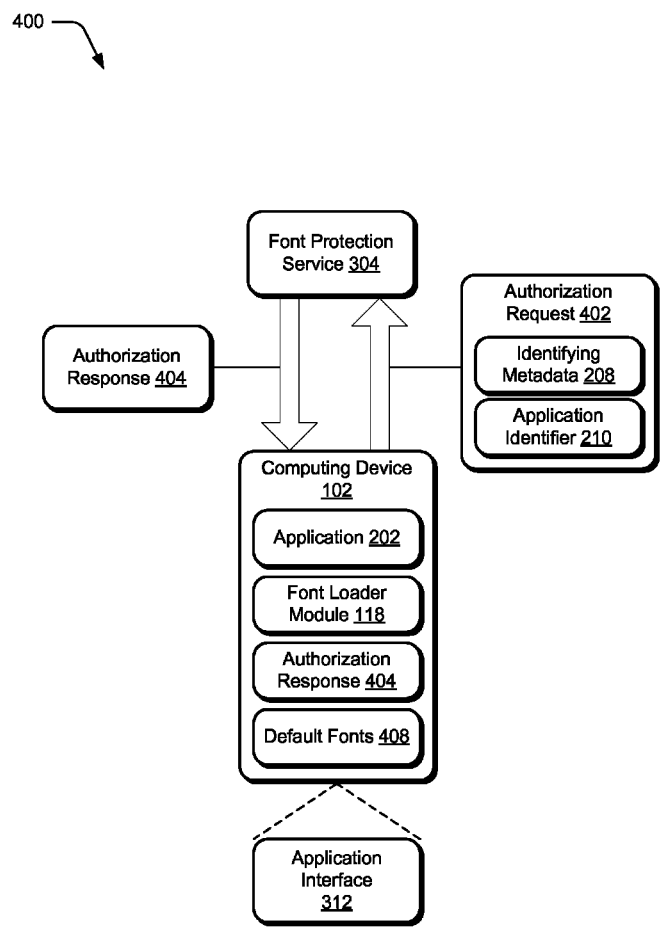
FIG. 4 illustrates an example scenario in which authorization to use protected fonts in connection with an application is requested from a font protection service, and a response indicative of authorization is received.

FIG. 4 depicts generally at 400 an example scenario in which authorization to use protected fonts in connection with an application is requested from a font protection service. For example, the application 202 may be launched. As in FIGS. 2 and 3, the application 202 is associated with the font package 116. As part of being launched, the application 202 makes a call to the font loader module 118 to load the obfuscated fonts 204 of the font package 116 for use with the application.

As discussed above, the first time the application 202 is launched, the font loader module 118 is configured to form an authorization request 402 for communication to the font protection service 304. The font loader module 118 may form the authorization request 402 using at least some of the identifying metadata 208 of the font package 116 and the application identifier 210 embedded in the application. The computing device 102 may communicate the authorization request 402 over the network 112 to the font protection service 304, which may be embodied on one or more servers of a service provider 110.

Using the authorization request 402, the font protection service 304 may determine authorization to use the obfuscated fonts 204 in connection with the application 202. To do so, the font protection service 304 may determine whether the application identifier 210 corresponds to the application for which the font package 116 is generated. The font protection service 304 may use the application identifier 210 and the identifying metadata 208 included in the authorization request 402 to make this determination. The font protection service 304 may compare this information to information that is stored in connection with generating font packages. If it is determined that the application identifier 210 does not correspond to the font package 116 identified in the authorization request 402, the font protection service 304 will not authorize use of the obfuscated fonts 204 in connection with the application 202. In such instances, the font protection service 304 sends an authorization response 404 back to the computing device 102 indicating that use of the obfuscated fonts 204 in connection with the application 202 is not authorized. On the other hand, if the font protection service 304 determines that the application identifier 210 does correspond to the font package 116 identified by the identifying metadata 208, the obfuscated fonts 204 can be authorized for use in connection with the application 202.

Using the identifying metadata 208, the font protection service 304 may also determine whether the font package 116 corresponds to the obfuscated fonts 204 for which authorization is requested. In particular, the font protection service 304 may determine whether the fonts identified in the authorization request are the fonts that were included in the font package 116. If a determination is made that the fonts identified in the authorization request 402 do not correspond to the font package 116, the font protection service 304 will not authorize use of the obfuscated fonts. In such instances, the font protection service 304 is configured to send an authorization response 404 back to the computing device 102 indicating that use of the obfuscated fonts 204 in connection with the application 202 is not authorized. However, if it is determined that the fonts identified in the authorization request 402 do correspond to the font package 116, the font protection service 304 can authorize use of the obfuscated fonts.

Authorization to use the obfuscated fonts 204 in connection with the application 202 also depends on whether there are any remaining authorizations allowed (e.g., authorizations paid for). Accordingly, the font protection service 304 may compare a number of authorizations given to a number of authorizations allowed to use the obfuscated fonts 204 in connection with the application 202. If there are no remaining authorizations allowed, the font protection service 304 generally determines that use of the obfuscated fonts 204 is not authorized in connection with the application 202. In some situations, however, a developer may be given a "grace period" to purchase more authorizations. For example, if the number of authorizations to use an obfuscated font in connection with an application is reached, a developer may be given a period of time (e.g., a week, thirty days, etc.) to purchase more authorizations. During the grace period, the font protection service 304 may be configured to authorize use of the obfuscated fonts 204 in connection with the application 202 even though the developer has no remaining authorizations allowed. If the developer does not purchase more authorizations before the grace period ends, the font protection service 304 is then configured to indicate that use of the obfuscated fonts 204 in connection with the application is not authorized.

If the number of authorizations given to use the obfuscated fonts 204 is less than the number of authorizations that are allowed, the font protection service 304 can authorize use of the obfuscated fonts in connection with the application 202. In at least some implementations, the font protection service 304 is configured to record a number of authorizations given to use the obfuscated fonts 204 with the application 202. By recording this information, the font protection service 304 can compare the number of authorizations given to the number of authorizations allowed as described above. Additionally, the font protection service 304 can communicate this information to a font provider, such as in a report indicating a number of times the font provider's font has been authorized for use with any applications. Based on the number of authorizations given, the font protection service 304 may also initiate compensation of the font provider.

Regardless of whether the fonts identified in the authorization request 402 are authorized for use with the identified application, the font protection service 304 sends an authorization response 404 to the computing device 102 that is indicative of authorization. The authorization response 404 may be stored locally at the computing device 102. Thus, when the application 202 is subsequently launched, the font loader module 118 may access the authorization response from local storage rather than request authorization from the font protection service 304.

When the font protection service 304 determines that use of the identified fonts is authorized in connection with the identified application, the authorization response 404 indicates that such use is authorized. Further, the authorization response 404 enables the font loader module 118 to de-obfuscate the obfuscated fonts 204 in the font package 116 and use these fonts in connection with the application 202. Once the fonts are de-obfuscated, the font loader module 118 may load the fonts so that text included in the application interface 312 is displayed using the fonts of the font package 116. As discussed previously, the font loader module 118 may also de-obfuscate the obfuscated fonts 204 when it is determined that the font protection service 304 is unavailable, and an authorization response regarding use of the obfuscated fonts 204 in connection with the application 202 has not yet been received. In such instances, the font loader module 118 may temporarily use the obfuscated fonts 204 with the application 202. When the application is subsequently launched, the font loader module 118 may again attempt to obtain authorization from the font protection service 304. Until an authorization response is received from the font protection service 304, the font loader module 118 may continue loading the fonts from the font package 116 for use with the application 202.

In one approach, when the authorization response 404 indicates that use of the obfuscated fonts 204 is authorized in connection with the application 202 such authorization may be considered "permanent". That is, authorization given to use the obfuscated fonts 204 in connection with the application 202 is not later revoked, such as when a developer fails to pay for authorizations given during a grace period. Authorization given to use the obfuscated fonts 204 in connection with the application 202 may carry over to upgrades such that an upgraded version of the application 202 may also be authorized to use the obfuscated fonts. On the other hand, authorization given to use the obfuscated fonts 204 in connection with the application 202 may not carry over when the application 202 is uninstalled and then reinstalled. Reinstalls may be considered a new activation of the application 202 and thus require use of the obfuscated fonts 204 to be authorized through the font protection service.

When the font protection service 304 determines that use of the identified fonts is not authorized in connection with the application, the authorization response 404 indicates that such use is not authorized. As a result, the authorization response 404 may cause the font loader module 118 to have default fonts 408 used in connection with the application 202. The default fonts 408 may correspond to system fonts or fallback fonts that are used in place of the fonts of the font package 116. Consequently, text included in the application interface 312 is displayed using the default fonts 408 rather than the fonts of the font package 116.

The font loader module 118 may also be configured to re-request authorization to use the obfuscated fonts 204 in connection with the application even though the authorization response 404 indicates that such use is not authorized. A developer may, for instance, have initially paid for too few authorizations to meet the demand to use the fonts in connection with the application. However, after being informed that the purchased authorizations have been consumed, the developer may purchase more authorizations. By re-requesting authorization at regular intervals, an application user that was initially denied authorization to use the obfuscated fonts 204 may subsequently be given authorization based on an additional purchase of activations.

Having discussed example details of the techniques for font protection management, consider now some example procedures to illustrate additional aspects of the techniques.

Example Procedures

This section describes example procedures for font protection management in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed by a suitably configured device, such as the example computing device 102 of FIG. 1 that makes use of a font loader module 118, or the service provider 110 of FIG. 1 which may be used to implement the font protection service 304 of FIG. 3.

Figure 5:
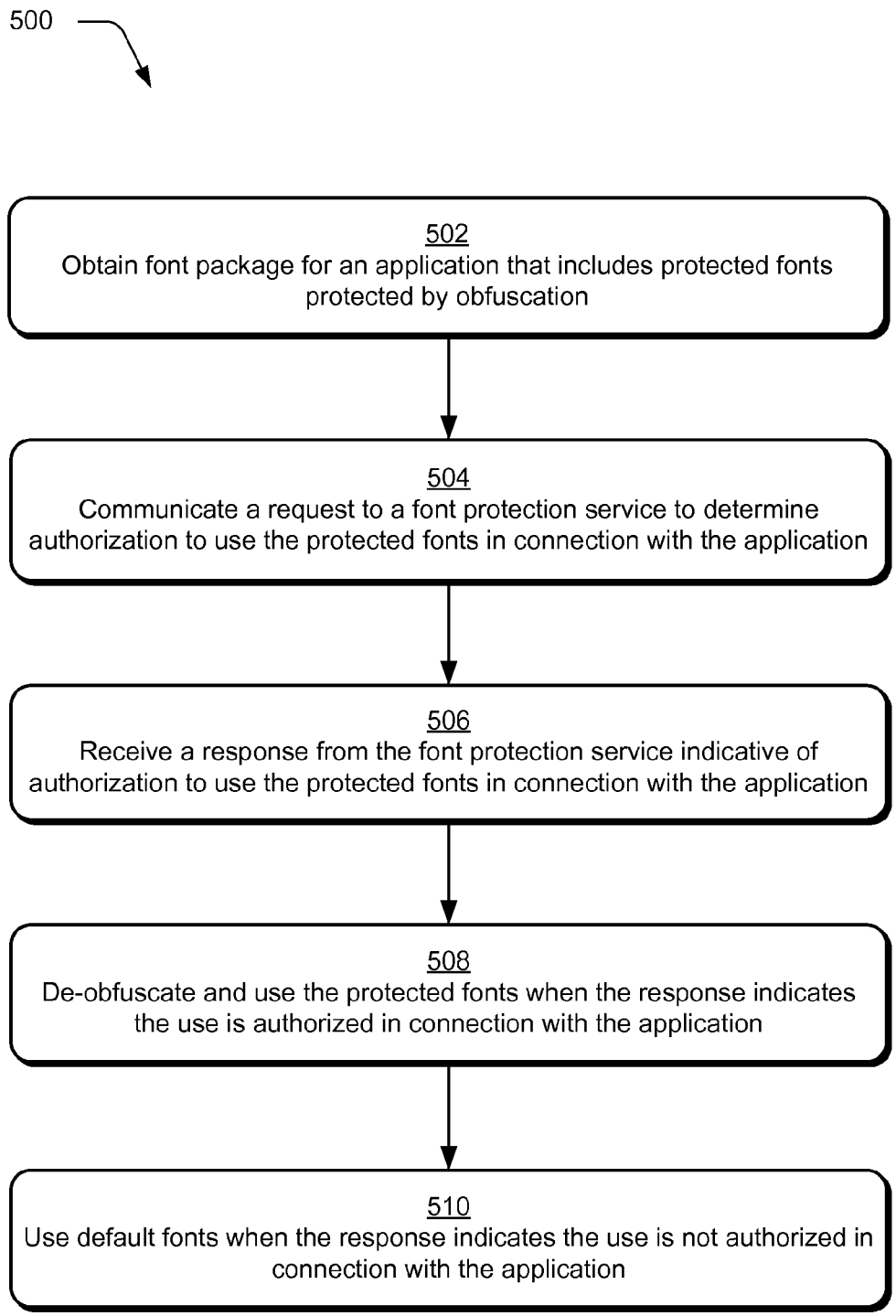
FIG. 5 is a flow diagram depicting an example procedure in accordance with one or more implementations.

FIG. 5 depicts an example procedure 500 in which an indication of authorization to use protected fonts in connection with an application may be obtained and applied. A font package for an application is obtained and includes one or more protected fonts that are protected by obfuscation (block 502). For example, font package 116, which is associated with application 202, may be obtained at computing device 102. As discussed above, the font package 116 may be obtained as part of the application 202 or may be obtained separately. The font package 116 includes obfuscated fonts 204, which may be OpenType or TrueType fonts that have been protected by obfuscation.

A request is communicated to a font protection service to determine authorization to use the protected fonts in connection with the application (block 504). For example, when the application 202 is launched a first time, authorization request 402 may be communicated to the font protection service 304. The information included in the authorization response may be used to determine authorization to use the obfuscated fonts 204 in connection with the application 202.

A response is received from the front protection service that is indicative of authorization to use the protected fonts in connection with the application (block 506). For example, the authorization response 404 may be received from the font protection service 304. The authorization response 404 may indicate that use of the obfuscated fonts 204 in connection with the application 202 is authorized or is not authorized.

The protected fonts are de-obfuscated and used in connection with the application when the response indicates that such use is authorized (block 508). For example, the authorization response 404 may indicate that use of the obfuscated fonts 204 is authorized in connection with the application 202. In this case, the obfuscated fonts 204 may be de-obfuscated and used with the application 202. The de-obfuscated fonts of the font package 116 may, for instance, be applied to text included in an application interface 312 of the application 202.

On the other hand, default fonts are used in connection with the application when the response indicates that use of the protected fonts is not authorized in connection with the application, (block 510). For example, the authorization response may indicate that use of the obfuscated fonts 204 is not authorized in connection with the application 202. As a result, the default fonts 408, which may correspond to fallback or system fonts, may be used with the application 202 instead of the fonts of the font package 116. It follows then that text included in the application interface 312 is displayed using the default fonts 408 when the obfuscated fonts 204 are not authorized for use in connection with the application 202.

Figure 6:
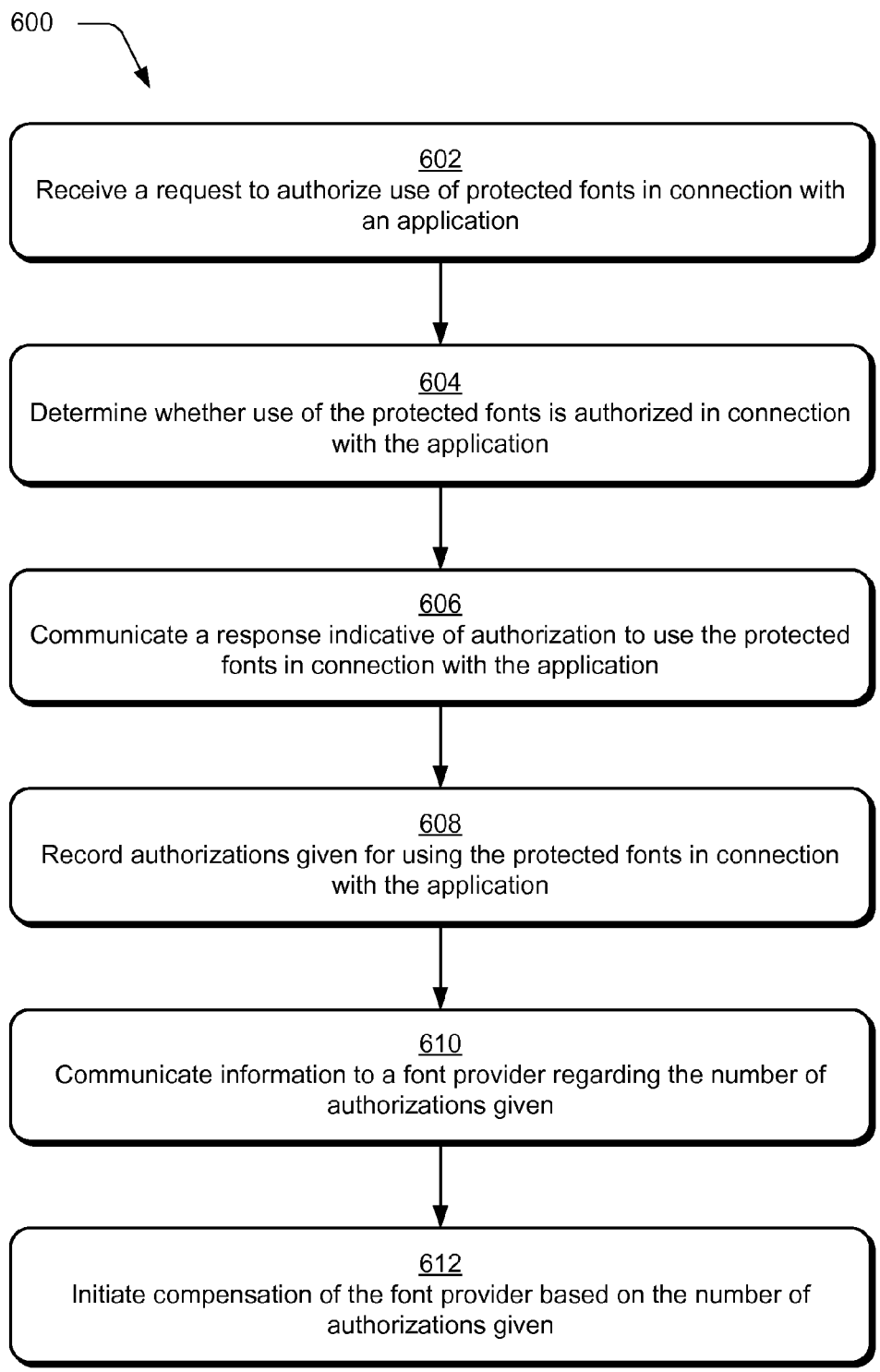
FIG. 6 is another flow diagram depicting an example procedure in accordance with one or more implementations.

FIG. 6 depicts another example procedure 600 in which a determination is made regarding whether to authorize use of a protected font in connection with an application. A request is received to authorize use of protected fonts in connection with an application (block 602). For example, the authorization request 402 may be received by the font protection service 304. The authorization request 402 may have been communicated to the font protection service 304 from the computing device 102 and across the network 112.

A determination is made regarding whether use of the protected fonts is authorized in connection with the application (block 604). For example, the font protection service 304 may determine whether use of the obfuscated fonts 204 is authorized in connection with the application 202. The font protection service 304 may do so using information included in the authorization request 402 as well as other information accessible to the font protection service e.g., information stored responsive to generating a font package, developer purchase information, and so on. As part of determining whether use of the obfuscated 204 fonts is authorized in connection with the application 202, the font protection service 304 may compare a number of authorizations given to a number of authorizations allowed. The font protection service 304 may also determine whether information stored at the font protection service indicates that an application and font package identified in the authorization request 402 correspond to the obfuscated fonts 204.

A response is communicated to a requestor that is indicative of authorization to use the protected fonts in connection with the application (block 606). For example, the authorization response 404 may be communicated from the font protection service 304, over the network 112, and to the computing device 102. The authorization response 404 indicates whether the obfuscated fonts 204 are or are not authorized for use in connection with the application 202.

Authorizations given for using the protected fonts in connection with the application are recorded (block 608). For example, when a determination is made that use of the obfuscated fonts 204 is authorized in connection with application 202, communication of the authorization response 404 is considered an authorization given. Thus, the font protection service 304 may increment a value representative of authorizations given to use the obfuscated fonts 204 in connection with the application 202. In this way, the font protection service 304 may track how many authorizations have been given to use the obfuscated fonts 204 in connection with the application 202.

Information is communicated to a font provider regarding the number of authorizations given (block 610). For example, the font protection service 304 may communicate a report to a provider of the obfuscated fonts 204. The report may indicate how many times authorization has been given to use the obfuscated fonts 204 in connection with the application 202. Further, the report may indicate how many times authorization has been given to use the obfuscated fonts 204 in connection with any application, not just with application 202.

Compensation of the font provider is initiated based on the number of authorizations given (block 612). For example, the font protection service 304 may initiate compensation of the provider of the obfuscated fonts 204. The compensation may be based on the recorded number of authorizations given, such as those recorded in block 608. Compensation may be initiated in a variety of ways by the font protection service 304. The font protection service 304 may tally the number of authorizations given and pay the font provider directly. Alternately, the font protection service 304 may communicate an amount that the font provider is to be compensated to another entity assigned to pay the font provider. The font protection service 304 may initiate compensation of a font provider in other ways without departing from the spirit and the scope of the techniques described herein.

Figure 7:
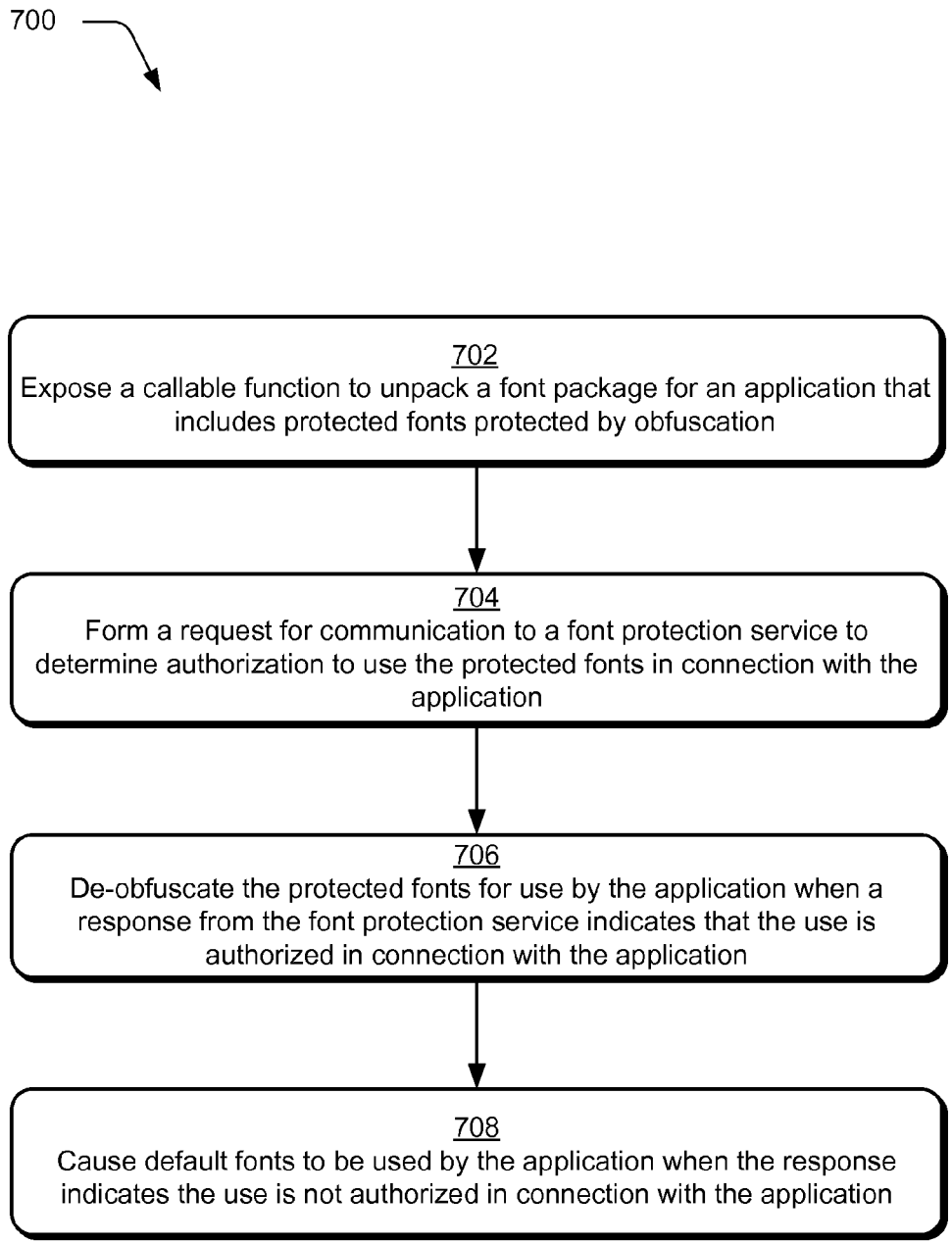
FIG. 7 is another flow diagram depicting an example procedure in accordance with one or more implementations.

FIG. 7 depicts another example procedure 700 in which operations are performed by a font loader module to load fonts for use in connection with an application. A callable function is exposed by the font loader module to unpack a font package for an application that includes protected fonts protected by obfuscation (block 702). For example, the font loader module 118 may expose callable font unpacking function 212. As discussed in more detail above, the font loader module 118 may be configured as an API and callable font unpacking function 212 may therefore correspond to an API call.

A request is formed by the font loader module for communication to a font protection service to determine authorization to use the protected fonts in connection with the application (block 704). For example, responsive to receiving a call via the callable font unpacking function 212 the font loader module 118 may form the authorization request 402 for communication to the font protection service 304. The authorization request 402 may be effective to determine whether use of the obfuscated fonts 204 in connection with the application 202 is authorized or not.

The protected fonts are de-obfuscated by the font loader module for use by the application when a response from the font protection service indicates that the use is authorized in connection with the application (block 706). For example, the font loader module 118 may de-obfuscate the obfuscated fonts 204 when the authorization response 404 indicates that use of the obfuscated fonts 204 is authorized in connection with the application. The font loader module 118 may then load the de-obfuscated fonts for use by the application 202.

Default fonts are used by the application when the response indicates that the use is not authorized in connection with the application (block 708). For example, the font loader module 118 may cause the default fonts 408 to be used with the application 202 when the authorization response 404 indicates that use of the obfuscated fonts 204 is not authorized in connection with the application. Thus, the font loader module 118 causes text included in the application interface 312 to be displayed using the default fonts 408 rather than the fonts of the font package 116.

Having described example procedures in accordance with one or more implementations, consider now an example system and device that can be utilized to implement the various techniques described herein.

Example System and Device

Figure 8:
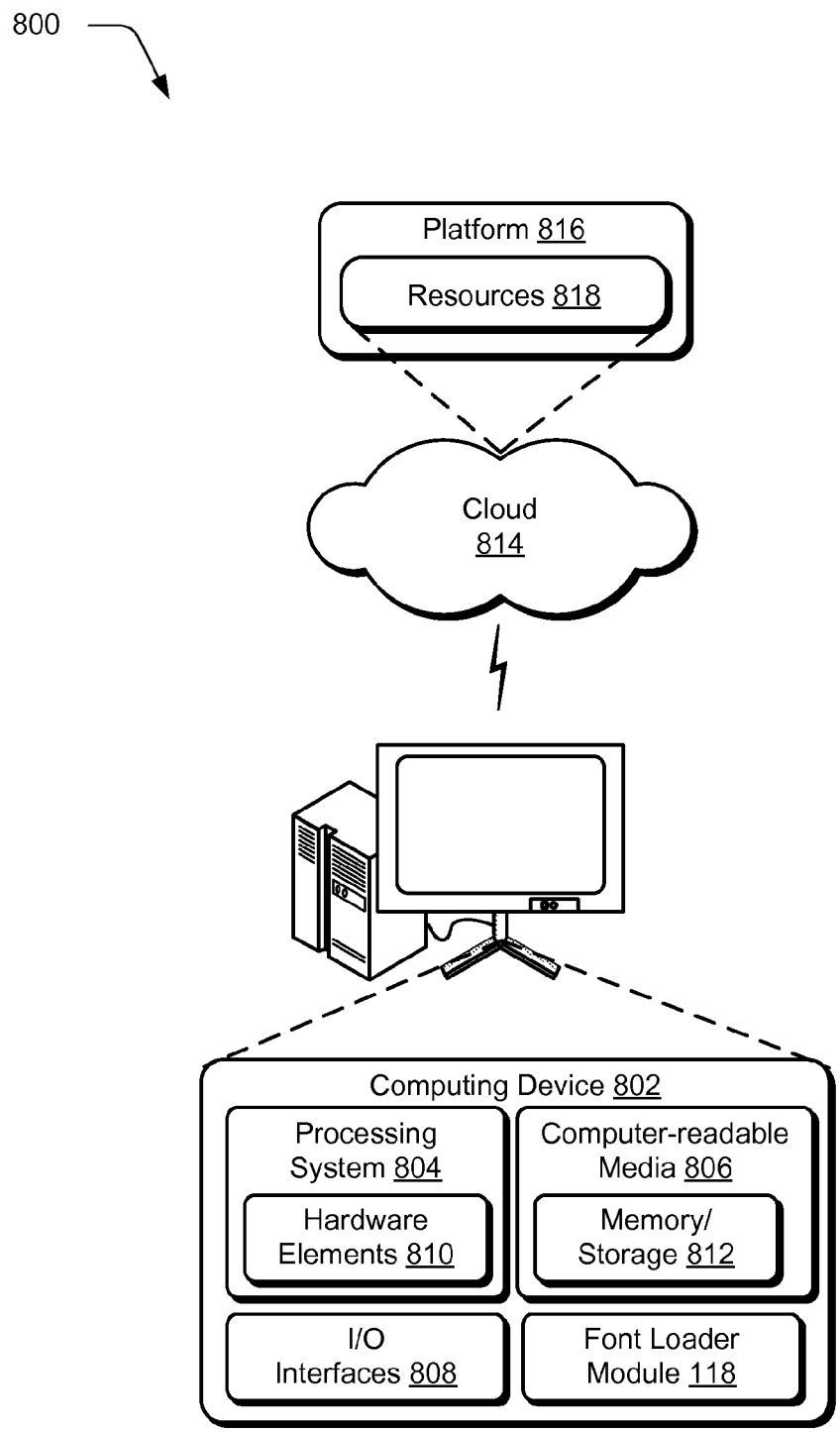
FIG. 8 illustrates an example system including various components of an example device that can be employed for one or more implementations of font protection management described herein.

FIG. 8 illustrates an example system generally at 800 that includes an example computing device 802 that is representative of one or more computing systems and/or devices that may implement the various techniques described herein. This is illustrated through inclusion of the font loader module 118, which operates as described above. The computing device 802 may be, for example, a server of a service provider, a device associated with a client (e.g., a client device), an on-chip system, and/or any other suitable computing device or computing system.

The example computing device 802 is illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device implementation, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    obtaining a font package for an application, the font package obtained from one or more servers and including one or more protected fonts protected by obfuscation;
    responsive to launching the application, communicating a request to a font protection service to determine authorization to use the one or more protected fonts in connection with the application, the request including an application identifier embedded in code of the application and metadata from the font package that identifies the font package and the one or more protected fonts, authorization to use the one or more protected fonts being determinable based on the application identifier and the metadata;
    receiving a response from the font protection service indicative of authorization to use the one or more protected fonts in connection with the application;
    responsive to the response from the font protection service indicating that use of the one or more protected fonts is authorized in connection with the application, de-obfuscating the one or more protected fonts, by the computing device, and displaying an interface of the application with the de-obfuscated fonts; and
    responsive to the response indicating that use of the one or more protected fonts is not authorized in connection with the application, displaying the interface of the application with one or more default fonts.

2. The method as described in claim 1, wherein the one or more protected fonts included in the font package are configured to remain obfuscated when use of the one or more protected fonts is attempted in connection with another application.

3. The method as described in claim 1, further comprising extracting the application identifier from the code of the application and the metadata from the font package.

4. The method as described in claim 1, wherein communicating the request is performed a first time the application is launched but not subsequent times the application is launched if the response indicates that use of the one or more protected fonts is authorized in connection with the application.

5. The method as described in claim 1, further comprising, prior to receiving the response from the font protection service, determining that the font protection service is unavailable, and de-obfuscating and temporarily using the one or more protected fonts in connection with the application.

6. The method as described in claim 5, further comprising responsive to launching the application a subsequent time, communicating an additional request to the font protection service to determine authorization to use the one or more protected fonts in connection with the application.

7. The method as described in claim 1, further comprising:
  storing the response from the font protection service in local storage; and
  responsive to launching the application and after the response is stored in local storage, accessing the response from the local storage to determine whether to use the one or more protected fonts or the one or more default fonts in connection with the application.

8. The method as described in claim 1, wherein obtaining the font package for the application comprises obtaining the font package along with the application.

9. The method as described in claim 1, wherein obtaining the font package for the application comprises obtaining the font package separately from the application.

10. A method implemented by a server device of a font protection service, the method comprising:
  responsive to an application being launched, receiving, from a computing device, a request to authorize use of one or more protected fonts in connection with the application, the request including an application identifier obtained from code of the application and metadata that identifies a font package of the application that includes the one or more protected fonts;
  determining whether use of the one or more protected fonts is authorized in connection with the application based, in part, on the application identifier and the metadata; responsive to a determination that use of the one or more protected fonts is authorized, communicating an authorization response to the computing device that indicates the application is authorized to use the one or more protected fonts, the authorization response enabling the computing device to de-obfuscate the one or more protected fonts and display an interface of the application with the de-obfuscated fonts; and responsive to a determination that use of the one or more protected fonts is not authorized, communicating a non-authorization response to the computing device that indicates the application is not authorized to use the one or more protected fonts, the non-authorization response causing the interface of the application to be displayed with one or more default fonts.

11. The method as described in claim 10, further comprising recording authorizations given for using the one or more protected fonts in connection with the application.

12. The method as described in claim 10, further comprising at least one of:
  communicating information to a font provider regarding a number of authorizations given; and initiating compensation of the font provider based on the number of authorizations given.

13. The method as described in claim 10, wherein determining whether use of the one or more protected fonts is authorized comprises comparing a number of authorizations given to a number of authorizations allowed for using the one or more protected fonts in connection with the application.

14. The method as described in claim 10, wherein determining whether use of the one or more protected fonts is authorized comprises determining whether the application identifier corresponds to an application with which use of the one or more protected fonts is authorized.

15. The method as described in claim 10, wherein determining whether use of the one or more protected fonts is authorized comprises determining whether the font package identified by the metadata corresponds to a font package for which use of the one or more protected fonts is authorized.

16. A system comprising:
  one or more processors; and
  a memory having stored thereon computer-readable instructions that are executable by the one or more processors to implement a font loader module to perform operations including:
  exposing a callable function to unpack a font package for an application that includes one or more protected fonts protected by obfuscation, the font package being associated with metadata that identifies the font package and the one or more protected fonts and the application including an application identifier embedded in application code; responsive to receiving a call to unpack the font package a first time, forming a request for communication to a font protection service to determine authorization to use the one or more protected fonts in connection with the application, including configuring the request to include the metadata and the application identifier, authorization to use the one or more protected fonts be determinable based on the metadata and the application identifier;
  receiving a response from the font protection service indicative of authorization to use the one or more protected fonts in connection with the application; responsive to the response indicating that use of the one or more protected fonts is authorized in connection with the application, de-obfuscating the one or more protected fonts and displaying an interface of the application with the de-obfuscated fonts; and responsive to the response indicating that use of the one or more protected fonts is not authorized in connection with the application, displaying the interface of the application with one or more default fonts.

17. The system as described in claim 16, wherein the font loader module is configured as a component of the application.

18. The system as described in claim 16, wherein the font loader module is configured as a component of the operating system and is accessible to multiple applications.

19. The system as described in claim 16, wherein the operations further include de-obfuscating the one or more protected fonts to enable the one or more protected fonts to be used by the application when the font protection service is unavailable for responding to the request associated with the first time.

20. The system as described in claim 16, wherein the operations further comprise forming an additional request for communication to the font protection service to determine authorization to use the one or more protected fonts in connection with the application responsive to receiving a call to unpack the font package a second time and when the font protection service is unavailable for responding to the request associated with the first time.

\* \* \* \* \*